UNITED STATES PATENT OFFICE.

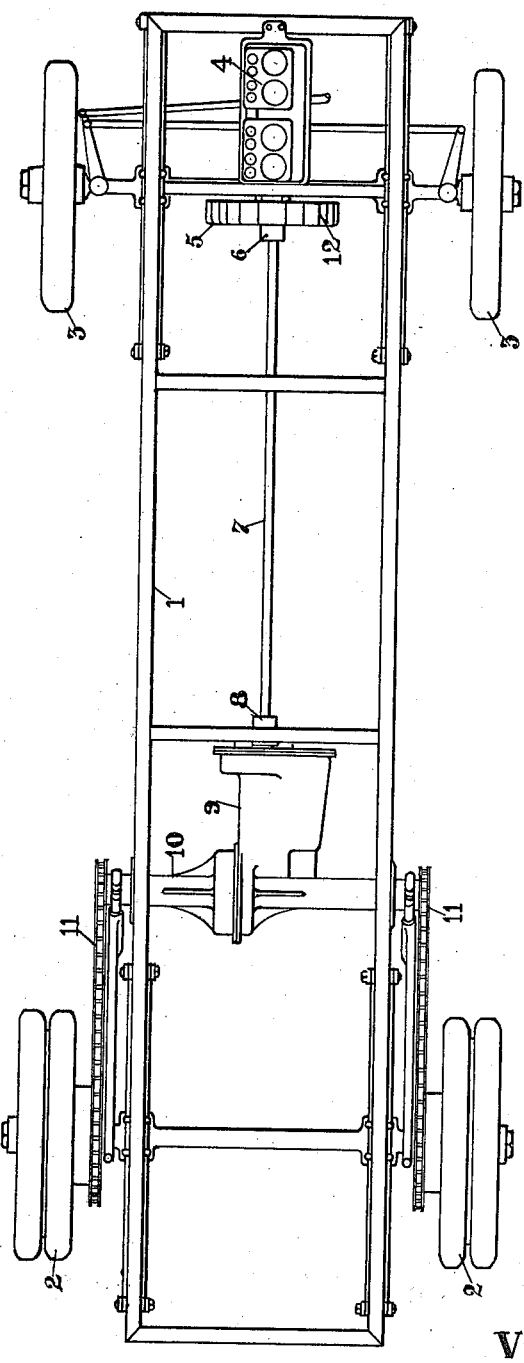

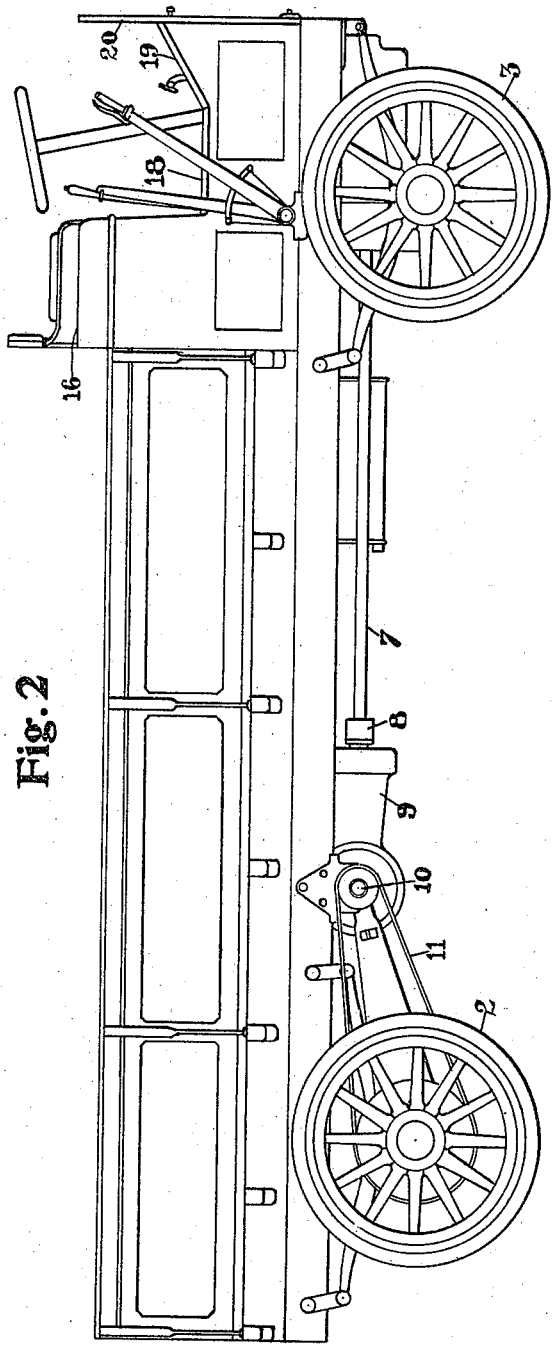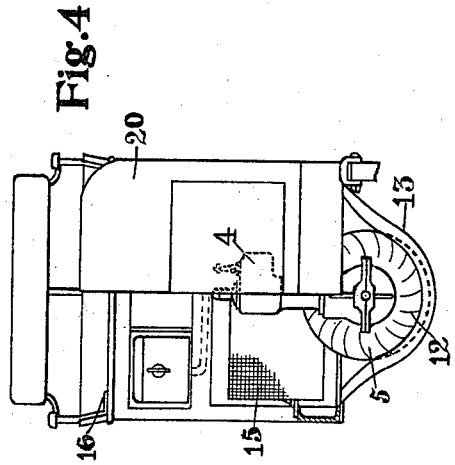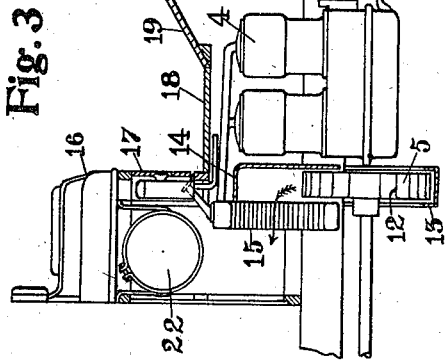

VINCENT LINK, OF DETROIT, MICHIGAN.

MOTOR-VEHICLE.

976,193.  Specification of Letters Patent.  Patented Nov. 22, 1910.

Application filed February 12, 1910. Serial No. 543,526.

*To all whom it may concern:*

Be it known that I, VINCENT LINK, a citizen of the United States of America, residing at Detroit, in the county of Wayne and State of Michigan, have invented certain new and useful Improvements in Motor-Vehicles, of which the following is a specification, reference being had therein to the accompanying drawings.

This invention relates to automobiles and more particularly to an arrangement thereof that is especially adaptable for use in trucks and like commercial vehicles, so-called, wherein it is desirable to obtain as long a load platform as possible with a given wheel base, and wherein it is necessary to shield the driving mechanism from injury and at the same time have it accessible for inspection and repair.

The invention consists in the matters hereinafter set forth, and more particularly pointed out in the appended claims.

Referring to the drawings, Figure 1 is a plan view with parts removed, of a vehicle embodying features of the invention; Fig. 2 is a view in side elevation of the vehicle; Fig. 3 is a view partly in side elevation and partly in section, of the forward part of the chassis showing the arrangement of the power plant and operator's platform; and Fig. 4 is a view in front elevation, partly broken away, of the vehicle.

In the drawings a chassis 1 is supported in the usual manner on traction bearing wheels 2 and guide bearing wheels 3. A suitable motor 4 is mounted on the forward end of the chassis with its fly-wheel 5 to the rear. A universal joint indicated at 6, of any preferred type, couples the motor to a transmission shaft 7. The rear end of the latter is connected by another universal joint 8 to a differential and change speed mechanism 9 of any desired design that drives a two-part jack-shaft 10 with chain and spocket connections 11 on the outer ends to the traction bearing wheels 2.

The fly wheel 5 is provided with blades 12 which are adapted to act as a fan to draw air from either side of the wheel and project it tangentially from the rim thereof. Any preferred form of blade construction may be used. A shield 13 covers the lower portion of the wheel and fan circumference so that the blast therefrom is directed upwardly and turned by a suitable casing 14 against a radiator 15 that is secured to the chassis below a driver's seat 16. A panel 17, driver's platform 18, foot-board 19 and dash 20 form with the seat a complete housing for the motor 4, its fly wheel and fan and the radiator. Suitable removable panels of any construction indicated at 21 permit free access to the parts. A tank 22 is supported beneath the seat 16 within the housing.

The seat, platform, board and dash replace the hood of the automobile of conventional type. As a truck moves very slowly, there is no advantage gained in having a radiator placed in front, as in the usual construction, as there is not sufficient natural draft when the vehicle is traveling to obviate the use of a fan. Furthermore if the radiator is in front on a truck it is extremely likely to be injured by contact with the projecting loads of other vehicles, in places where the vehicles are usually loaded and its position within the housing of the seat and adjacent parts protects it from accidents of this nature.

By utilizing the space over the motor for the driver's platform the entire remaining portion of the chassis is available as a load platform which is therefore larger in proportion to the wheel base than in the ordinary standard construction and distributes the load more evenly on the wheels.

What I claim as my invention is:—

1. In an automobile, a chassis, a motor at the forward end thereof, a differential jack shaft near the rear end thereof, change speed gearing driving the differential, a transmission shaft coupled by universal joints to the gearing and motor shaft, a fly wheel on the motor adjacent the transmission shaft provided with side intake rim delivery fan blades, a radiator on the chassis above and to the rear of the fly wheel, and a casing adapted to direct the blast from the fan blades through the radiator.

2. In an automobile, a chassis, a motor at the forward end thereof with a fly wheel on the inner end of the motor provided with side intake, rim delivery fan blades, a radiator on the chassis adjacent the inner face of the fly wheel, a casing for directing blast from the fan blades through the radiator, and an operator's seat, platform and foot board forming a housing over the motor, fly wheel and radiator.

3. In an automobile, a chassis provided with forward steering wheels and rear traction bearing wheels, a transverse differential jack shaft on the chassis adjacent the traction bearing wheels, chain and sprocket connections between each traction wheel and the adjacent portion of the jack shaft, and change speed transmission mechanism driving the differential jack shaft, a longitudinally disposed transmission shaft, a universal joint coupling the inner end of said shaft with the change speed mechanism, a motor on the forward end of the chassis having a fly wheel arranged on its inner end adjacent the end of the transmission shaft, side intake rim delivery fan blades on the fly wheel, a radiator on the chassis adjacent the fly wheel, and a casing for directing the blast from the fan blades through the radiator.

4. In an automobile, a chassis provided with forward steering wheels and rear traction bearing wheels, a transverse differential jack shaft on the chassis adjacent the traction bearing wheels, chain and sprocket connections between each traction wheel and the adjacent portion of the jack shaft, change speed transmission driving the differential jack shaft, a longitudinally disposed transmission shaft, a universal joint coupling the inner end of said shaft with the change speed mechanism, a motor on the forward end of the chassis having a fly wheel arranged on its inner end adjacent the transmission shaft, a universal joint coupling the adjacent end of the transmission shaft to the motor, side intake rim delivery fan blades on the fly wheel, a radiator on the chassis adjacent the fly wheel, a casing for directing the blast from the fan blades through the radiator, a dash across the forward end of the chassis, and a driver's seat, platform and foot board above the motor and radiator and forming with the dash a housing for the power plant.

5. In an automobile, a chassis, a motor at the forward end thereof with a fly wheel on the inner end of the motor provided with fan blades, a radiator on the chassis in rear of and adjacent to the inner face of the fly wheel, a casing for directing the blast from the fan blades through the radiator, and an operator's seat or platform forming a housing over the motor and radiator.

In testimony whereof I affix my signature in presence of two witnesses.

VINCENT LINK.

Witnesses:
OTTO F. BARTHEL,
LEWIS E. FLANDERS.